Figure 1:
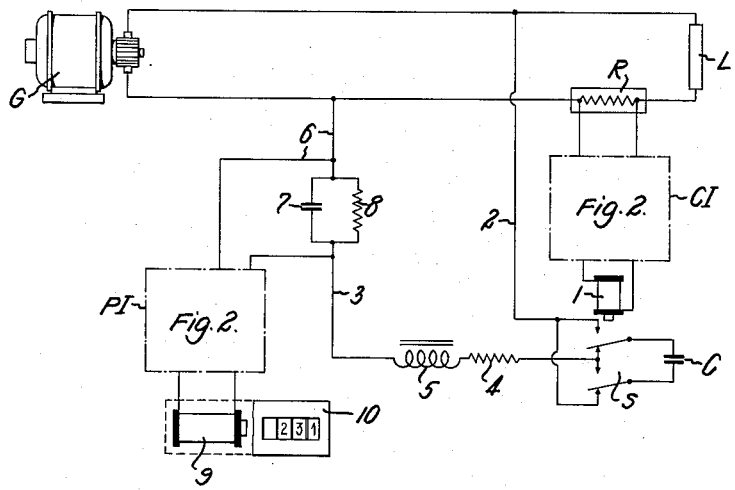

Dec. 22, 1953  R. W. GILBERT  2,663,846
INTEGRATING DIRECT CURRENT WATTMETER
Filed Aug. 5, 1949

INVENTOR:-
Roswell W. Gilbert,
BY
Pierce, Scheffler & Parker,
Attorneys.

Patented Dec. 22, 1953

2,663,846

UNITED STATES PATENT OFFICE 2,663,846

INTEGRATING DIRECT CURRENT WATTMETER

Roswell W. Gilbert, Montclair, N. J., assignor to Weston Electrical Instrument Corporation, Newark, N. J., a corporation of New Jersey Application August 5, 1949, Serial No. 108,811

5 Claims. (Cl. 324—135)

This invention relates to integrating direct current wattmeters, and more particularly to integrating wattmeters which may be employed in the recording of power consumption at high direct current levels such as are customary in heavy electrolytic processes.

The invention is not limited in its application to the integration of electrical power of particular ranges of voltage and current values but it is of special interest in the case of heavy direct current loads since, so far as now known, there is no practical equipment commercially available for that purpose. Integrating apparatus including a coil oscillating in a magnetic field, as described and broadly claimed in my prior Patent No. 2,239,363, issued April 22, 1941, provided for the first time commercially practical apparatus for integrating heavy currents against time, and embodiments of the present invention include a current integrator such as described in the aforesaid patent, in the patent to Anthony H. Lamb, No. 2,286,036, granted June 9, 1942, and in my copending application Serial No. 715,282, filed December 10, 1946. The power integrating apparatus includes a second integrator of the oscillating coil type for integrating potential against time; the current and the potential integrators being effectively arranged in series in such manner that the overall integration is a product function of the load current and the load potential, i. e. is proportional to the power consumption.

Objects of the invention are to provide integrating apparatus including a plurality of units which each integrate a variable quantity against time; the units being cascaded or effectively in series, whereby the overall integration against time is a product function of the several variable quantities. Objects are to provide integrating apparatus including, in cascade or series arrangement, a plurality of integrating units of the oscillating coil type and each energized in accordance with the varying magnitude of an electrical quantity; the rate of energization of one integrating unit being controlled by the frequency of oscillation of the coil of another integrating unit. Objects of the invention are to provide integrating direct current wattmeters which include, in series, a pair of integrating units of oscillating coil type and respectively energized in accordance with the current through and the potential across a load circuit. More specifically, an object is to provide an integrating wattmeter having two integrating units for connection to a direct current load circuit, the integrating units being respectively energized in accordance with the load voltage and the load current, and the frequency of energization of one of the integrating units being controlled by the other integrating unit. An object is to provide an integrating wattmeter including two integrating units of the oscillating coil type, one unit being energized in accordance with the load current and the other being energized in accordance with the load voltage, and a relay controlled by one of the units for determining the rate or frequency of energization of the other unit.

Figure 2:
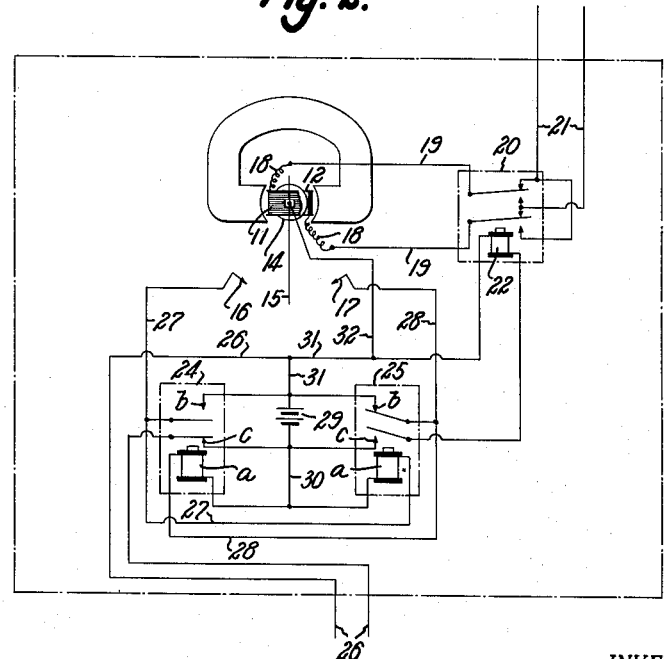

These and other objects and the advantages of the invention will be apparent from the following specification when taken with the accompanying drawings in which:

Fig. 1 is a schematic diagram of an integrating direct current wattmeter embodying the invention; and Fig. 2 is a circuit diagram of an integrating unit.

In Fig. 1 of the drawings, the reference character G identifies a source of direct current across which a load L is connected by leads in which a resistance R of low value is serially arranged to develop a voltage drop proportional to the load current. A current integrating device CI is shunted across the resistance R and is thereby energized by a current proportional to the load current. The shunt resistance may of course be omitted when the load current is of a low order which can be passed through the current integrating device but, in general, the invention is particularly useful in the measurement of power inputs at current values of a high order such as customarily measured by a ammeter provided with a low resistance shunt.

As will be explained in detail hereinafter, the current integrating device CI energizes the solenoid I of a relay periodically, and at a rate determined by the current integration, to actuate the movable blades of a polarity reversing switch S across which a condenser C is connected. The stationary blades of the polarity reversing switch are in a circuit connected across the source G and are thereby energized by the voltage across the load circuit L. One set of fixed contacts of the polarity reversing switch is connected to one terminal of source G through a lead 2, and the other set of fixed contacts is connected to a potential integrating device PI by a lead 3 in which a damping circuit, comprising a resistance 4 and choke 5, is serially arranged. The other input terminal of the potential integrator PI is returned to the current source G through a lead 6. A smoothing or current-averaging circuit comprising a condenser 7 shunted by a resistance 8 is connected across the input leads 3, 6 to the potential integrator PI to protect it against sudden current surges. The solenoid 9 of a counting device 10 is energized by the potential integrator PI periodically at each accumulation of a preselected watts-time value.

As indicated by the legends "Fig. 2" within the blocks CI and PI which represent integrating devices in the Fig. 1 schematic diagram, both integrating devices may have the circuit arrangement which is illustrated in detail in Fig. 2. The same circuit is shown in Fig. 1 of Patent No. 2,239,363, and it was selected for illustration here in view of the simplicity and symmetry of a battery-energized integrating device but it is to be understood that other circuit arrangements such for example as described in the aforesaid patents and application may be employed. The physical structure of the integrating element is similar to that of a microammeter of the pivoted coil, permanent magnet type, but with the restoring springs omitted and a contact arm mounted upon the pivoted coil for alternate engagement with spaced stationary contacts to close relay circuits for (1) reversing the direction of the current through the coil, and (2) energizing an output relay at the completion of a cycle of oscillation of the pivoted coil.

As shown in Fig. 2, coil 11 is wound on a metal frame 12 and is supported by the usual jewel bearings, not shown, for pivotal movement in the gaps between the polar surfaces of the permanent magnet 13 and the core 14. The moving coil carries a contact arm 15 and displaces the same between two relatively stationary contacts 16, 17 that limit the oscillatory motion of the coil.

Current connections to the coil 11 are made through fine coiled filaments 18, 18 that impose substantially no torque load on the moving systems. Leads 19 extend from the filaments 18 to the moving blades of a polarity reversing switch 20 having sets of fixed blades connected by leads 21 across the shunt resistor R in the case of the current integrating device CI or to leads 3 and 6 in the case of the potential integrating device PI. The switch 20 is of the electromagnetic type and includes a solenoid 22 for operating the blades in one direction against the action of a restoring spring, not shown.

A pair of interlocking relays 24, 25 are controlled by the contact system of the integrating mechanism and, in turn, control the energization of the polarity reversing switch 20 and of leads 26 to the output solenoid 1 or 9 respectively. Each relay includes a solenoid a, and two sets of alternatively closed contacts b, c. Lead 27 extends from the contact 16 of the integrating device to the blade of the interlocking contacts b of relay 24 and to the solenoid a of relay 25. Similarly, lead 28 extends from contact 17 to the blade of the interlocking contacts b of relay 25 and solenoid a of relay 24. A lead 30 from one terminal of a current source 29 is connected to the fixed contacts of the sets c of both relays, and both solenoids are returned to the same lead. The blade contact of set c of relay 24 is connected to one lead 26, and the blade of set c of relay 25 is connected to the solenoid 22 of the polarity reversing switch or relay 20. Solenoids 22 and the other lead 26 are both returned to the other terminal lead 31 of the current source, and the contact arm 15 of the integrating device is connected to lead 21 by a jumper 32. The relay circuits are completed by connections from the fixed contact of both sets b to the lead 31.

The moving coil 11 is displaced by the current therethrough at that angular velocity at which the torque due to the current through the coil is exactly equal to the reaction torque of the induced current in the metal coil frame 12. The direction of travel of the coil 11 is automatically reversed by relays 24, 25 as the contact arm 15 strikes the contacts 16, 17, in alternation, and the total travel of the coil determines the number of pulse energizations of the output leads 26.

The method of operation of the illustrated integrating wattmeter embodiment of the invention is therefore as follows: The current integrating device CI is energized by a current proportional to the load current, and the oscillating coil swings back and forth at a speed which varies with the instantaneous value of the load current, thereby energizing relay 1 at a rate or frequency which varies with the integrated value of the load current. The polarity reversing switch S is thereby actuated at a rate or frequency dependent upon the load current, and the current to the potential integrating device is therefore a function of the integrated load current since the number of reversals of the charging of the condenser C is determined by the actuation of the polarity reversing switch. Each current charge of the condenser C is determined by the potential across the source G, and the total energizations of solenoid 9 of the watthours counter 10 therefore varies as the product of the instantaneous load current and load potential, i. e. is a measure of the power input to the load L.

The invention has been described as applied to the measurement of the power input to a direct current load circuit but it will be apparent that the invention is of broader utility and may be employed for the integration of the product of other electrical values which may vary independently in accordance with the instantaneous values of different but related quantities.

It is to be understood that the invention is not limited to the circuit constructions and arrangements herein shown and described, and that various modifications fall within the spirit and scope of the invention as set forth in the following claims.

I claim:

1. In apparatus, for integrating against time the product of different related electrical variables of an electrical network a plurality of cascaded current-actuated integrating units, the number of integrating units being equal to the number of electrical variables, input circuits for energizing the several integrating units each in accordance with a different one of said variables, the input circuit for one integrating unit including in series a condenser and polarity reversing switch, whereby the said integrating unit responds to the average charge-discharge current of the condenser to develop a voltage integration, means controlled by another integrating unit to actuate said polarity reversing switch, and an indicator actuated by the final one of the cascaded integrating units to register the time integrated product function of the said variables.

2. In an integrating wattmeter for registering the power input to a direct current load circuit, the combination of two integrating units connected effectively in series, means including a resistance for inclusion in series in the load circuit for energizing one of said units in accordance with the load current, input means for connection across the load circuit to energize the other integrating unit in accordance with the load potential, said input means including a condenser and a polarity reversing switch in series with said other integrating unit, and means energized by the first integrating unit for actuating said polarity reversing switch.

3. In an integrating wattmeter, the combination with an integrating unit having input terminals across which a potential may be established to energize the unit in accordance with a load current, and a relay periodically energized by said integrating unit in accordance with integrated current-time values; of a second integrating unit having an input circuit for energization in accordance with the load potential, said input circuit including a polarity reversing switch and a condenser, said polarity reversing switch being contacts of said relay of the first integrating unit.

4. In an integrating wattmeter, the invention as recited in claim 3, wherein one of said integrating units is of the oscillating coil type.

5. In an integrating wattmeter, the invention as recited in claim 3, wherein both of said integrating units are of the oscillating coil type.

ROSWELL W. GILBERT.

References Cited in the file of this patent

UNITED STATES PATENTS

| Number | Name | Date |
| --- | --- | --- |
| 1,743,137 | Hill | Jan. 14, 1930 |
| 1,745,868 | Sawin | Feb. 4, 1930 |
| 2,017,703 | Pratt | Oct. 15, 1935 |
| 2,137,133 | Dallmann | Nov. 15, 1938 |
| 2,286,036 | Lamb | June 9, 1942 |
| 2,294,692 | Pratt | Sept. 1, 1942 |
| 2,312,491 | Siewert | Mar. 2, 1943 |